(12) United States Patent
Williams et al.

(10) Patent No.: US 6,473,625 B1
(45) Date of Patent: Oct. 29, 2002

(54) EARPIECE ACOUSTICS

(75) Inventors: David Williams, Alton (GB); John Mercer, Teddington (GB)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/221,741

(22) Filed: Dec. 28, 1998

(30) Foreign Application Priority Data

Dec. 31, 1997 (GB) .............................................. 9727483

(51) Int. Cl.[7] .................................................. H04B 1/38
(52) U.S. Cl. ........................ 455/550; 381/351; 381/353; 379/433.01
(58) Field of Search ........................ 455/550, 90, 575, 455/349, 350, 347, 899; 379/428, 429, 433, 428.01, 433.01, 433.02, 440, 444; 381/353, 380, 71.6, 351; 181/145

(56) References Cited

U.S. PATENT DOCUMENTS

| | | | |
|---|---|---|---|
| 3,819,879 A | | 6/1974 | Baechtold .................... 179/179 |
| 5,313,661 A | | 5/1994 | Malmi et al. ............. 455/232.1 |
| 5,621,791 A | * | 4/1997 | Sloan .................... 379/433.01 |
| 5,701,354 A | | 12/1997 | Komoda et al. ............. 381/157 |
| 5,729,605 A | * | 3/1998 | Bobisuthi et al. ........ 439/433 X |
| 5,742,733 A | | 4/1998 | Jarvinen ..................... 395/2.29 |
| 5,836,790 A | | 11/1998 | Barnett ........................ 439/620 |
| 5,953,414 A | * | 9/1999 | Abraham et al. ....... 379/433.01 |
| 5,974,157 A | * | 10/1999 | Tajima et al. ........... 381/353 X |
| 6,002,949 A | * | 12/1999 | Hawker et al. ........ 379/433.01 |
| 6,058,315 A | | 5/2000 | Clark .......................... 455/550 |
| 6,144,738 A | * | 11/2000 | Hawker et al. ........ 379/433.01 |

FOREIGN PATENT DOCUMENTS

| | | |
|---|---|---|
| DE | 39 00 051 A1 | 7/1990 |
| DE | 94 08 930 U1 | 11/1995 |
| EP | 0 364 935 | 4/1990 |
| GB | 2 311 187 A | 9/1997 |
| WO | WO 92/02012 | 2/1992 |
| WO | WO 97/00592 | 1/1997 |
| WO | WO 97/47117 | 12/1997 |

* cited by examiner

Primary Examiner—Tracy Legree
(74) Attorney, Agent, or Firm—Perman & Green, LLP

(57) ABSTRACT

A radiotelephone is provided which comprises a housing 1 having an earpiece port 4, a loudspeaker 6 and a resonator. The resonator comprises and earpiece path form the loudspeaker to the earpiece port4. Further, the resonator also comprises an internal cavity 7, which may be ring, and a path 8 from the loudspeaker 6 to the internal cavity 7, to provide a specified resonance performance.

29 Claims, 6 Drawing Sheets

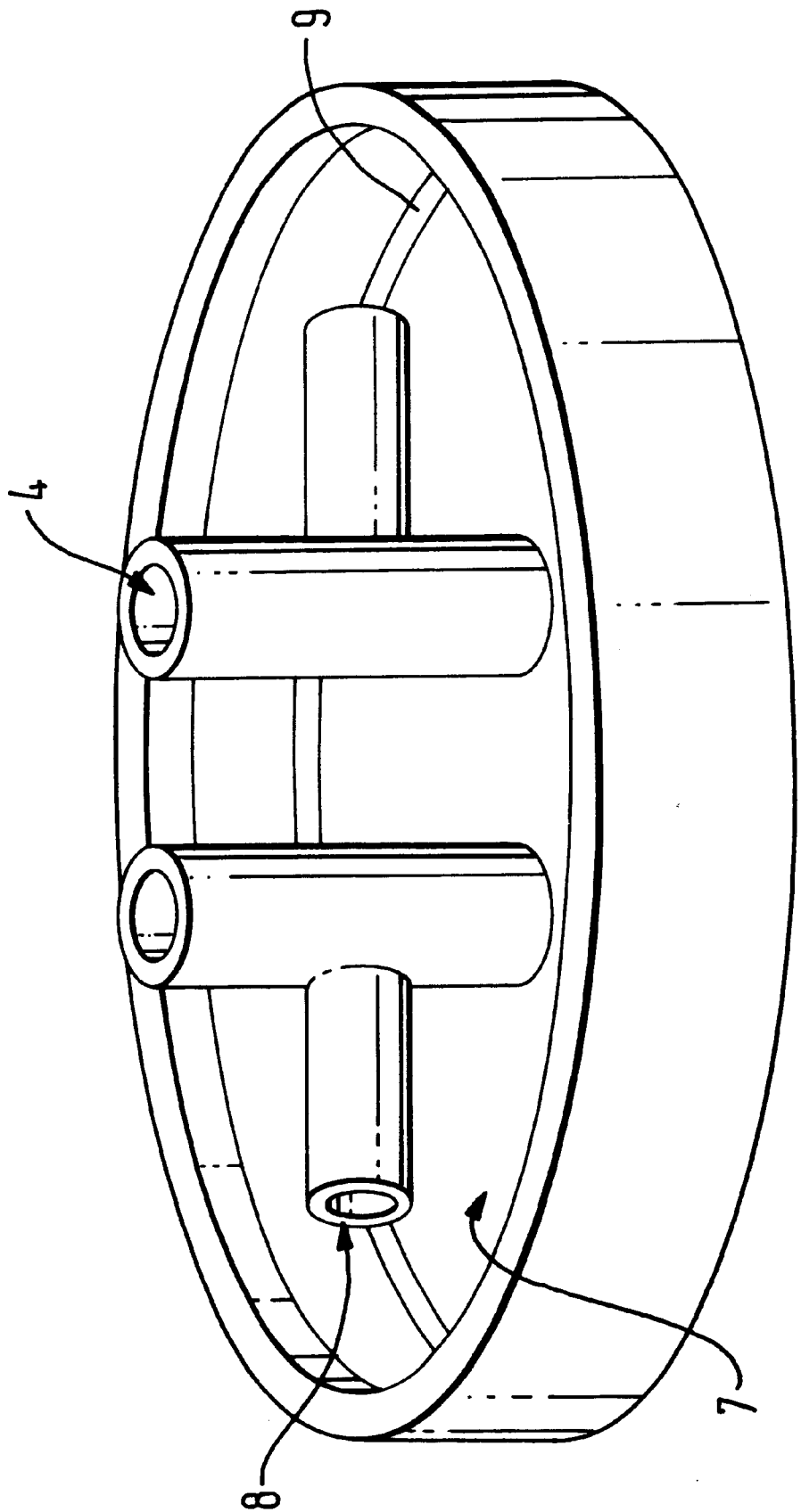

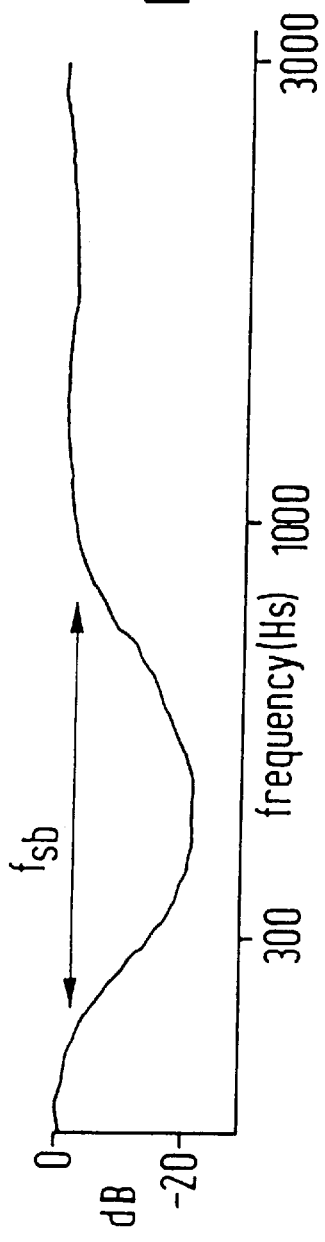
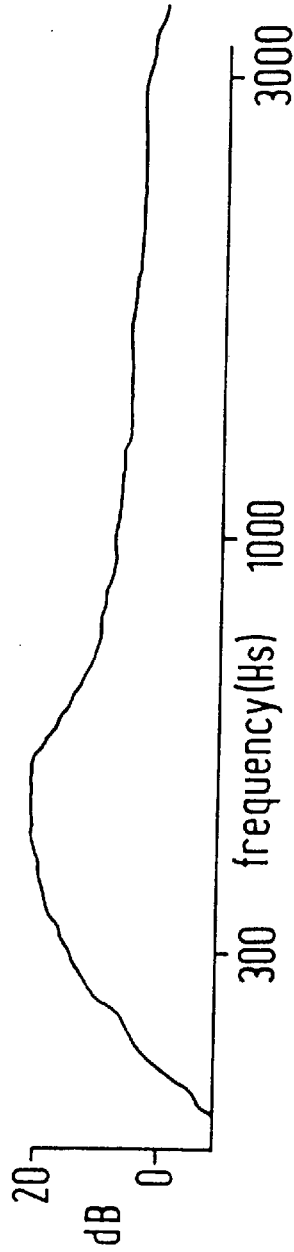
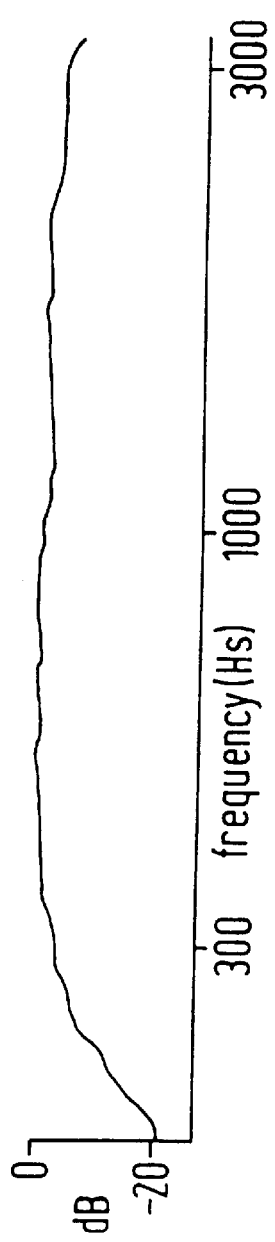

EARPIECE ACOUSTICS

BACKGROUND OF THE INVENTION

This invention relates to improvements in earpiece acoustics, and in particular to earpieces used in mobile telephones.

Much emphasis has recently been placed on improving the audio quality of mobile phones. This is a challenging role for the designer since the drive for smaller products is contrary to the goal of high quality audio. One of the problems in moving to smaller earpiece speakers is the loss in the low frequency output efficiency. Coupled to this, the speaker output at low frequencies (300 Hz to 1000 Hz) becomes more sensitive to the changing acoustic conditions resulting in highly variable performance between users. The primary acoustic parameter responsible for this variability in performance is termed Acoustic Leakage, and is associated with poor low frequency audio quality due to unpredictable sealing between the user's ear and the phone's front cover. The acoustic leak formed in this way causes the speech from the phone earpiece to sound weak and thin due to insufficient low frequency content.

Standard earpiece designs that are not leak tolerant experience large variations in audio quality due to the fluctuating acoustic loads imposed by a users ear. The result is poor low frequency audio performance which causes speech output through the earpiece to sound thin and weak. Leak tolerant designs offer a more predictable and stable audio quality across a wide range of users and operating conditions.

The most advanced leak tolerant design currently available makes the speaker less sensitive to external loading conditions by introducing a designed acoustic leak within the phone's front cover. In practice the speaker is held a fraction of a millimeter away from the front cover and the sound energy is 'leaked' into the phone internally. This internal leak causes the speaker output at low frequencies to be less dependent on external load variations. However, this leak tolerant design is hard to realise practically.

SUMMARY OF THE INVENTION

According to the present invention, there is provided a resonator for a radiotelephone having a housing with an earpiece port and a loudspeaker, the resonator comprising a housing, a first channel for channelling sound between the loudspeaker and the earpiece port, and an internal cavity and second channel for channelling sound between the loudspeaker and the internal cavity, to provide a specified resonance performance.

The second channel and internal cavity form a Helmholtz resonator whose response is controlled by the physical dimensions of the second channel, the internal cavity and the area of the earpiece port. Hence, the present invention provides a self-contained acoustic solution for a given earpiece port. The self-contained acoustic solution is favourable for a number of reasons.

Firstly, its leak tolerant characteristics are independent of the internal characteristics of the telephone. Hence, the leak tolerant characteristics do not vary with the ageing and internal acoustics of the radiotelephone and thus this self-contained acoustic solution more reliable than existing leak-tolerant solutions. Moreover, the leak tolerance performance is phone design independent, so that the same earpiece solution can be used for a range of different phones.

Secondly, the design impedes the ingression of dirt and water into the phone. Unlike the present leak tolerant solution which requires large earpiece ports, the design of the present invention works better with small speaker ports and consequently increases speaker protection. Also, as the acoustic system is separate from the internal electronics etc. of the phone, any dirt or water which did manage to enter through the earpiece port would not reach these internal electronics and thus would not damage any sensitive electronic components.

Thirdly, there is no extra leakage of sound energy into the radiotelephone compared to non-leak tolerant phones. That is, acoustic coupling between the speaker and the microphone is the same as for a standard non-leak tolerant phone. Hence, the design according to the present invention avoids any potential unwanted acoustic coupling between the speaker and microphone which might occur in present leak-tolerant systems when sound energy from the loudspeaker is leaked into the phone.

The internal cavity of the resonator of the present invention may be exposed through an open face in the resonator housing. This open face may be closable by part of the housing of the radiotelephone, to reduce the thickness of the radiotelephone. Alternatively, the internal cavity of the resonator may be enclosed within the resonator housing, so that no design restraints are even put on the shape of the earpiece part of the radiotelephone housing.

The resonator may comprise a plurality of internal cavities and channels for channelling sound between the loudspeaker and the respective internal cavity. The choice will depend on the acoustic characteristics required in the specific application.

There is also provided an acoustic insert for a radiotelephone having a housing with an earpiece port, the insert comprising a resonator according to the present invention and loudspeaker.

The loudspeaker may have a low frequency response which complements the specified resonance performance. This would then provide a combined flat response resulting in a more stable high quality audio performance.

There is also provided a radiotelephone comprising a housing having an earpiece port, a loudspeaker, and a resonator according to the present invention. The resonator and loudspeaker may form part of an acoustic insert.

The radiotelephone preferably comprises a compensation filter for compensating for the specified resonance performance, so as to provide a combined flat response resulting in a more stable high quality audio performance. Such a compensation filter may be realised by the loudspeaker having a low frequency response which complements the specified resonance performance. Alternatively, it may be realised by a digital signal processor. This alternative is preferred since it enables the use of conventional speakers which are much cheaper than a speaker with an enhanced low-frequency response, for example.

The radiotelephone housing may form at least part of the housing of the resonator. For example, but not exclusively, it may be used to cover an open face in the resonator housing to enclose the internal cavity of the resonator.

The internal cavity or plurality of cavities may form a ring. Alternatively, the may form a square, rectangle or the like.

BRIEF DESCRIPTION OF THE DRAWINGS

Embodiments of the invention will now be described, by way of example, with reference to the accompanying drawings, in which:

FIG. 5 is a three dimensional illustration of an insert providing the acoustic subsystem of FIG. 4;

FIG. 6a is a frequency response for an acoustic subsystem according to an embodiment of the present invention;

FIG. 6b is a frequency response which complements that of the acoustic subsystem shown in FIG. 6a and which may be provided by a speaker, for example; and FIG. 6c shows the flat frequency response resulting from the combination of the frequency responses shown in FIGS. 6a and 6b.

DETAILED DESCRIPTION OF THE DRAWINGS

Figure 1:
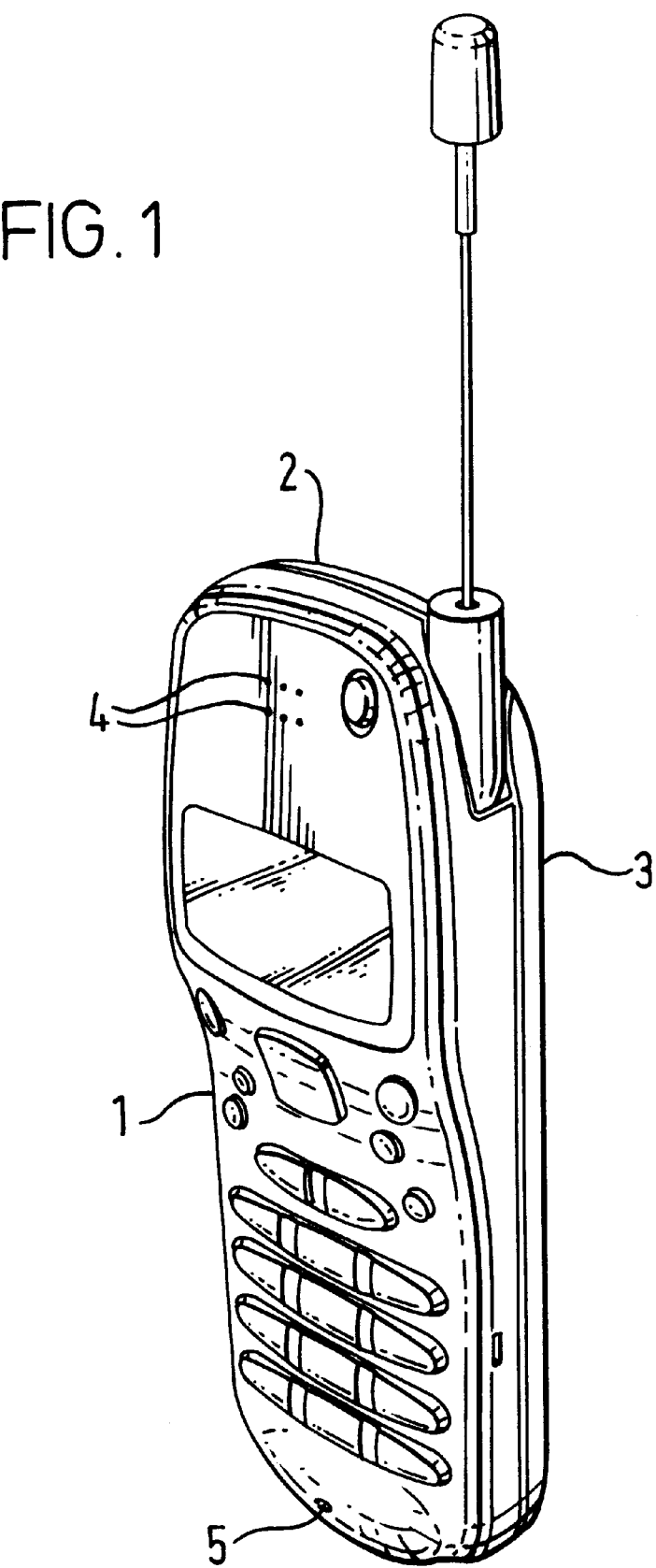
FIG. 1 is a perspective view of a handportable radiotelephone.

FIG. 1 shows a typical radiotelephone which could comprise an acoustic resonator according to the present invention. This radiotelephone comprises a front housing or cover 1 and a rear housing 2, which house the electronics of the phone, and a battery 3 which is removably attachable to the front and rear housings. The front housing 1 has an earpiece region comprising earpiece ports 4 for outputting sound from the phone's loudspeaker to the user's ear, and a mouthpiece region comprising a microphone port for inputting sound from the user into the phone's microphone.

Figure 2:
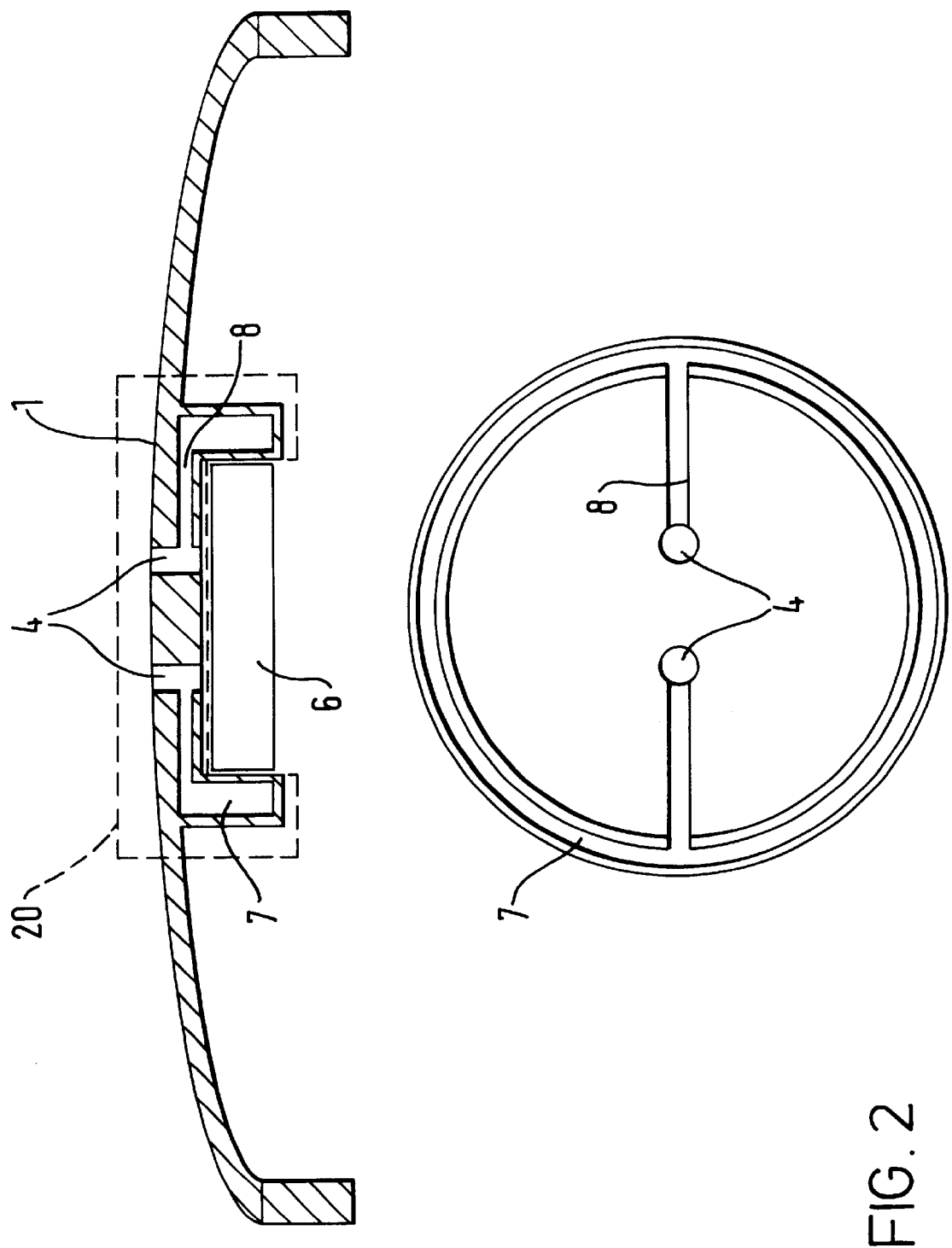
FIG. 2 is side and plan view of an earpiece and acoustic subsystem in accordance with an embodiment of the invention.

FIG. 2 shows the earpiece region of a radiotelephone in accordance with an embodiment of the present invention, from the front and the side. The radiotelephone comprises a speaker 6 and a resonator or acoustic sub-system for isolating the phone's loudspeaker from varying loading effects. The acoustic sub-system has been termed ALTR—the acoustic leak tolerant ring. It comprises a resonator housing 20, which in this embodiment is partially formed from an earpiece region of the front cover 1 of the radiotelephone having two earpiece ports 4. The resonator housing 20 encloses a sealed acoustic cavity 7, which in this embodiment is in the form of a ring. This ring defines a space into which the speaker 6 can tightly fit, so that acoustic pressures generated by the speaker's diaphragm radiate only via the earpiece ports 4 and not behind the speaker. Two acoustic paths are defined within the resonator housing 20 for each earpiece port 4, an earpiece path from the speaker 6 to each earpiece port 4, and a ring path 8 from the speaker 6 to the acoustic cavity 7. In this embodiment the ring ports are branched from the respective earpiece paths, but they may be totally separate.

The speaker 6 radiates sound to the user's ear via the earpiece path and ports 4 in the front cover 1 of the radiotelephone. Sound is also channelled to the acoustic cavity 7 via the ring paths 8. The acoustic cavity 7 and the ring paths 8 form a Helmholtz resonator, the response of which is determined by the physical dimensions of the acoustic cavity 7, the ring paths 8 and the area of the earpiece ports 4. In this configuration, the ALTR acts as a side-branch resonator to the normal earpiece acoustic system and stabilizes the earpiece response as explained with reference to FIGS. 6a to c below.

The acoustic cavity 7 can be continuous or divided into smaller individual cavities. That is, it need not be a ring. The choice will depend on the acoustic characteristics required in the specific application.

The ALTR according to this embodiment of the present invention may be implemented to stabilize the acoustic transfer function of the earpiece in various frequency regions for a wide range of users. An example of the implementation of an ALTR for a typical radiotelephone earpiece is given below:

speaker radius=6.5 mm speaker height=3.0 mm earpiece port area=2.0 mm$^2$ acoustic (ring) cavity
  inner radius=7.0 mm
  outer radius=8.8 mm
  inner volume=310.0 mm$^3$ ring height=3.5 mm ring material thickness=0.5 mm ring path diameter=0.4 mm (2 identical paths)

ring path length=10.0 mm

Resonant frequency=480 Hz approx.

Figure 3:
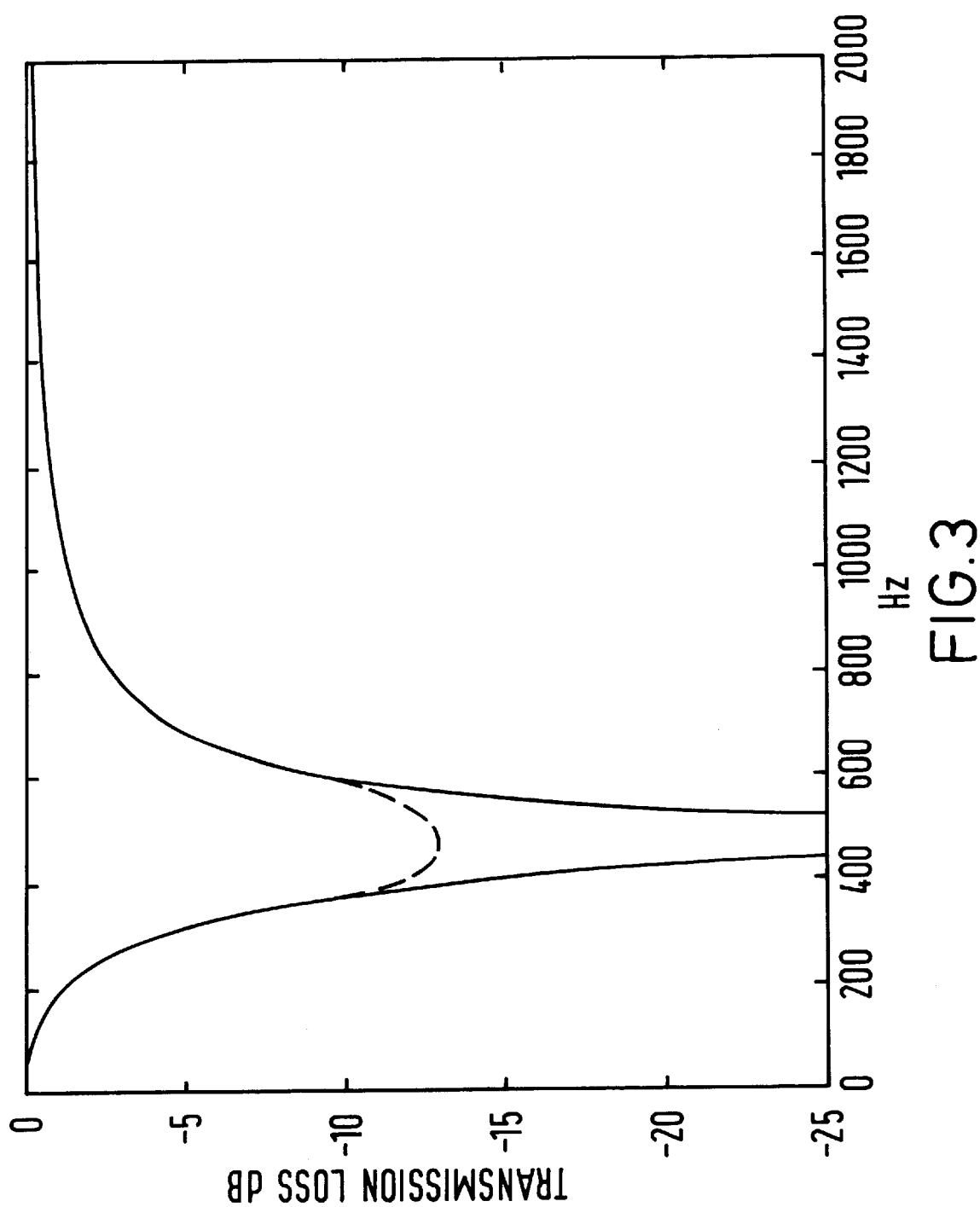
FIG. 3 is a graph showing the frequency response of the acoustic subsystem shown in FIG. 2.

FIG. 3 shows the frequency response of the ALTR shown in FIG. 2 with the above dimensions. Damping has been ignored in the response and so the null is much deeper than would be expected in the real case. The dashed curve in FIG. 3 indicates a 'typical response' with damping present. The depth of the null would be matched to the response of the speaker 6/DSP to achieve a flat combination response as described with reference to FIGS. 6a to 6c below. Matching is preferably derived empirically, since it is difficult to achieve sufficiently accurate estimates by current numerical modeling techniques. If the damping in the basic system is insufficient then additional damping can be introduced by increasing the resistance in the ring path 8 using suitable material such as foam. Alternatively, the aspect ratio of the ring paths could be increased (i.e. made into narrow slits) which would increase the damping. However, this latter approach is less preferable since it would necessitate small tolerances on the mechanical design of the ring paths which might prove to be a hinderance during production.

Although designed as a rectangular cavity around the speaker in FIG. 2, the ALTR may be moulded into any shape suitable for the product. It is only the volume of the acoustic cavity 7, area of the ring path, length of the ring path and area of the earpiece port 4 that are important in determining the resonant frequency—the form factor is irrelevant.

The ALTR can be wholly integrated into the front cover of a radiotelephone during the moulding process. Alternatively it can be manufactured separately, in which case it can either be formed as an acoustic insert with integral resonator (either with or without the speaker) or as an insert which combines with the A cover to provide the ALTR.

The acoustic cavities can generally be more accurately produced by separate manufacture, in particular by assembling the ALTR in two halves—both sections combining to form the sealed acoustic cavity 7. An embodiment which implements this can be seen in FIG. 4 of the accompanying drawings.

In this embodiment, the front cover 1 of the radiotelephone is extended to form part of the acoustic cavity area. The hatched section 10 is an acoustic insert, comprising the ALTR sub assembly, which is inserted into the radiotelephone housing during production. The insert has a lip which clips around the extended part of the cover 1 to keep it in place. The front cover 1 of the radiotelephone is recessed to accept a portion of the insert 10 and align its earpiece paths with the earpiece ports 4. This should be a good fit to ensure no acoustic pressure leakage into the acoustic cavity 7. A seal is provided between the ALTR sub assembly and the extended part of the front cover 1 of the radiotelephone to further prevent acoustic leakage from the ALTR. This seal may be of the adhesive type used on current speakers. The seal and clip assist in separating the earpiece from the rest of the phone, thus ensuring that the front cover and the ALTR sub assembly form a well sealed internal cavity which can provide specified frequency characteristics irrespective of the other characteristics of the phone. The speaker can be fixed to the lower portion of the ALTR sub-assembly as in current handset designs.

This embodiment is desirable since the enclosed cavities can easily be realized without prohibitive moulding processes and the ring paths 8 and earpiece paths in the sub-assembly can be made to the required tolerance without prohibitive costs being incurred in the manufacture of the front housing 1 of the radiotelephone.

Figure 4:
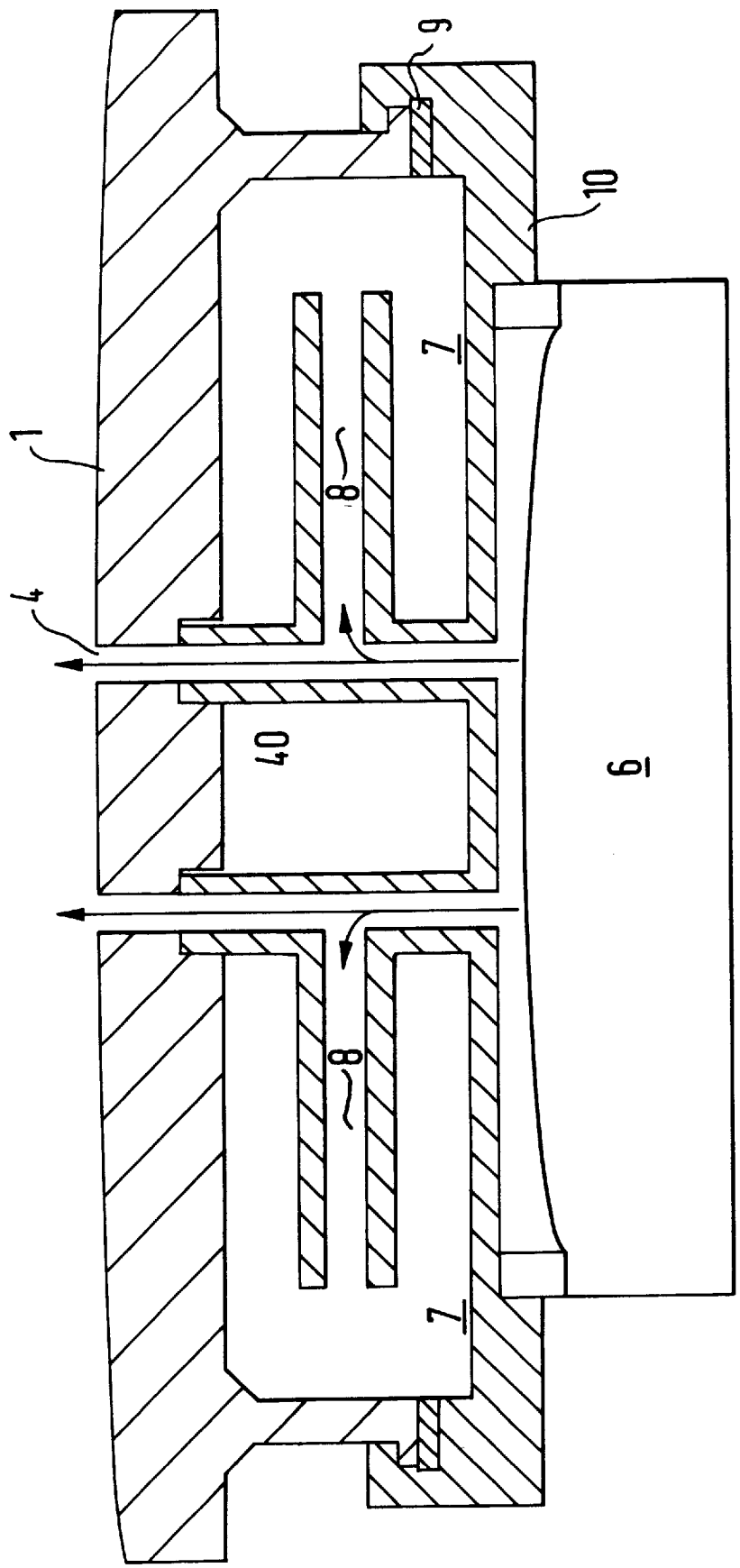
FIG. 4 is a side view of an earpiece and acoustic subsystem in accordance with an embodiment of the present invention.

FIG. 5 gives a general overview of the ALTR sub-assembly design of FIG. 4 in three dimensions. As can be appreciated from this figure, the design of this part separately from the front cover of the radiotelephone enables the required tolerances to be readily achieved on the ring paths, since they are easily accessed for boring.

Comparison of FIGS. 2 and 4 show how the shape of the ALTR can be modified to conform with any specific product case requirements. For example, in FIG. 2 the acoustic (ring) cavity is around the perimeter of the speaker 6, whilst in FIG. 4 the acoustic (ring) cavity is predominantly sandwiched between the speaker 6 and the front cover 1 of the radiotelephone. Variations between these extremes would also be acceptable.

The acoustic effects of the present invention will now be described.

At low frequencies, the impedance presented to the speaker is dominated by the acoustic load developed by the characteristics of the cavity formed between the user's ear and the front cover.

Under ideal conditions, a sealed cavity will be formed between the ear and the front cover, thereby presenting a relatively high load impedance to the speaker. Under such conditions a well designed system has little difficulty in developing sufficient acoustic pressure at low frequencies and maintaining a flat response from 300 Hz upwards.

However, under conditions when the cavity between the ear and the front cover is not completely sealed (as is the normal case) then the load impedance presented to the speaker reduces. This reduces the radiation efficiency of the speaker at low frequencies and results in poor earpiece audio quality.

The ALTR reduces variations in speaker radiation efficiency by minimizing load impedance variations experienced by the speaker.

The ALTR achieves this by presenting the speaker with a low impedance acoustic path which extends over a similar frequency range to that effected by external acoustic leaks (e.g. 300 Hz to 1000 Hz).

The effect of this low impedance path is that the speaker is masked from any acoustic impedance changes caused by variable ear/front cover boundary seals. The majority of the load sensed by the speaker within the frequency range influenced by the ALTR is the loading characteristics of the ALTR. Therefore, the frequency response of the earpiece becomes less dependent on the poorly defined external acoustic conditions and more dependent on the well defined internal conditions imposed by the ALTR.

The low impedance path introduced into the earpiece by the ALTR generates a null in the earpiece response (see FIG. 6a). To compensate for this, the speaker may be designed to have an enhanced low frequency response which complements that of the null (see FIG. 6b). With such a speaker fitted in the ALTR both responses combine to form an approximately flat response as shown in FIG. 6c.

Over the bandwidth of the ALTR system ($f_{sb}$) the speaker drives continuously into a low impedance. As a result, its radiation efficiency is dominated by the ALTR and is less sensitive to external loading variations. The frequency response of the earpiece therefore remains flat over a wide range of operating conditions developing a more stable, high quality audio performance across a range of different users.

As an alternative to using a speaker with enhanced low-frequency response, a standard low cost speaker could be used in conjunction with a suitable bandpass filter implemented electronically, for example by using the phone's digital signal processor (DSP). The DSP filter would be designed to compensate for the ALTR response null, offer more control over the composite frequency response and enable the use of low cost speakers.

Alternatively, the low frequency boost could be obtained from the acoustic system itself rather than by generating it using the DSP, using an enhanced low-frequency speaker, or by other means. The low frequency boost can be automatically generated by utilizing the fact that the earpiece paths and the volume of the cavity 40 just ahead of the speaker (see FIG. 4) form a resonant system that can be tuned to compensate for the null introduced by the ALTR side-branch resonator. However, in practice this approach is likely to be more complicated than using DSP methods.

One particularly useful implementation of the present invention is in a phone which adopts acoustic features such as Earpiece Active Noise Cancellation (EANC). These features require the phone acoustics to have a stable, well defined response and the use of a practical acoustic leak tolerant system such as the ALTR enables audio systems such as EANC to have a more robust and hence more reliable performance. Independent of phone type.

In view of the foregoing description it would be evident to a person skilled in the art that various modifications may be made within the scope of the claims. For example, some leak tolerant speaker designs require porting at the rear of the speaker. In such systems the speaker installation has to provide a clearance of at least 1 mm away from the closest surface. The ALTR of the present invention could protrude below the rear of the speaker in a castellated form thus generating the required clearance behind the speaker while allowing uninhibited rear sound radiation. In other words the ring cavity could be deeper than the speaker by an amount approximately the same as the required clearance.

What is claimed is:

1. A resonator for a radiotelephone having a housing with an earpiece port and a loudspeaker, the resonator comprising:

a housing, a first linear channel for channeling sound between the loudspeaker and the earpiece port, an internal cavity, and a second channel for channeling sound between the loudspeaker and the internal cavity and providing a specified resonance performance, and further comprising a compensation filter for compensating for the specified resonance performance, wherein the compensation filter comprises a digital signal processor.

2. A resonator as claimed in claim 1, wherein the internal cavity is enclosed within the resonator housing.

3. A resonator as claimed in claim 1, comprising a plurality of internal cavities and channels for channelling sound between the loudspeaker and the respective internal cavity.

4. An acoustic insert for a radiotelephone having a housing with an earpiece port, the insert comprising:
   a resonator as claimed in claim 1; and
   a loudspeaker.

5. A radiotelephone comprising:
   a housing having an earpiece port; and
   an acoustic insert as claimed in claim 4.

6. A radiotelephone comprising:
   a housing having an earpiece port;
   a loudspeaker; and
   a resonator as claimed in claim 1.

7. A radiotelephone as claimed in claim 6, wherein the radiotelephone housing forms at least part of the housing of the resonator.

8. A radiotelephone as claimed in claim 6, wherein the internal cavity is exposed through an open face in the resonator housing and wherein the open face in the resonator housing is closed by the radiotelephone housing to enclose the internal cavity of the resonator.

9. A resonator having a housing with an earpiece port and a loudspeaker, the resonator comprising:
   a housing, a first channel for channeling sound between the loudspeaker and the earpiece port, an internal cavity, and a second channel for channeling sound between the loudspeaker and the internal cavity and providing a specified resonance performance, wherein the internal cavity is exposed through an open face in the resonator housing, and further comprising a compensation filter for compensating for the specified resonance performance, wherein the compensation filter comprises a digital signal processor.

10. An acoustic insert for a radiotelephone having a housing with an earpiece port, the insert comprising:
    a resonator as claimed in claim 9; and
    a loudspeaker.

11. A radiotelephone comprising:
    a housing having an earpiece port;
    a loudspeaker; and
    a resonator as claimed in claim 9.

12. A resonator for a radiotelephone, the radiotelephone having a housing with an earpiece port and a loudspeaker, the resonator comprising:
    a housing, a first channel for channeling sound between the loudspeaker and the earpiece port, and an internal cavity characterized wherein a second channel for channeling sound between the loudspeaker and the internal cavity is provided to give a specific resonance performance which causes a low frequency loss, and wherein low frequency boosting is provided to compensate for the low frequency loss.

13. A resonator as claimed in claim 12, wherein the low frequency boosting is provided by tuning the dimensions of the first/second resonator channels/internal cavity to compensate for the low frequency loss.

14. A resonator as claimed in claim 12, wherein the internal cavity is exposed through an open face in the resonator housing.

15. A radiotelephone as claimed in claim 14, wherein the open face in the resonator housing is closed by the radiotelephone housing to enclose the internal cavity of the resonator.

16. A resonator as claimed in claim 12, wherein the internal cavity is enclosed with the resonator housing.

17. A resonator as claimed in claim 12, comprising a plurality of internal cavities and channels for channeling sound between the loudspeaker and the respective internal cavity.

18. An acoustic insert for a radiotelephone, the radiotelephone having a housing with an earpiece port the insert comprising:
    a resonator as claimed in claim 12; and
    a loudspeaker.

19. An acoustic insert as claim in claim 18, wherein the low frequency boosting is provided by the loudspeaker which has a low frequency response which complements the specified resonance performance.

20. A radiotelephone comprising:
    a housing having an earpiece port; and
    an acoustic insert as claimed in claim 18.

21. A radiotelephone as claimed in claim 20, which comprises a compensation filter for compensating for the specified resonance performance.

22. A radiotelephone as claimed in claim 21 wherein the compensation filter comprises the loudspeaker having a low frequency response which complements the specified resonance performance.

23. A radiotelephone as claimed in claim 21, wherein the compensation filter comprises a digital signal processor.

24. A radiotelephone as claimed in claim 20, wherein the radiotelephone housing forms at least part of the housing of the resonator.

25. A radiotelephone comprising:
    a housing having an earpiece port;
    a loudspeaker; and
    a resonator as claimed in claim 12.

26. A radiotelephone as claimed in claim 25, which comprises a compensation filter for compensating for the specified resonance performance.

27. A radiotelephone as claimed in claim 26, wherein the compensation filter comprises the loudspeaker having a low frequency response which complements the specified resonance performance.

28. A radiotelephone as claimed in claim 26, wherein the compensation filter comprises a digital signal processor.

29. A radiotelephone as claimed in claim 25, wherein the radiotelephone housing forms at least part of the housing of the resonator.

* * * * *